US009765207B2

(12) United States Patent
Furukawa (10) Patent No.: US 9,765,207 B2
(45) Date of Patent: Sep. 19, 2017

(54) POLYMER MICROPARTICLE-DISPERSED RESIN COMPOSITION AND METHOD FOR PRODUCING SAME (75) Inventor: Yoshio Furukawa, Takasago (JP)

(73) Assignee: KANEKA CORPORATION, Osaka (JP)

( * ) Notice: Subject to any disclaimer, the term of this patent is extended or adjusted under 35 U.S.C. 154(b) by 348 days.

(21) Appl. No.: 13/997,745

(22) PCT Filed: Dec. 28, 2011

(86) PCT No.: PCT/JP2011/080380
§ 371 (c)(1),
(2), (4) Date: Aug. 8, 2013

(87) PCT Pub. No.: WO2012/093631
PCT Pub. Date: Jul. 12, 2012

(65) Prior Publication Data
US 2013/0310484 A1 Nov. 21, 2013

(30) Foreign Application Priority Data
Jan. 5, 2011 (JP) ................ 2011-000776
Nov. 2, 2011 (JP) ................ 2011-240879

(51) Int. Cl.
C08L 83/00 (2006.01)
C08L 19/02 (2006.01)
C08J 5/24 (2006.01)
C08L 63/00 (2006.01)
C08J 3/00 (2006.01)
C08L 9/10 (2006.01)
C08L 13/02 (2006.01)

(52) U.S. Cl.
CPC .............. C08L 19/02 (2013.01); C08J 3/005 (2013.01); C08J 5/24 (2013.01); C08L 9/10 (2013.01); C08L 13/02 (2013.01); C08L 63/00 (2013.01); C08J 2363/00 (2013.01)

(58) Field of Classification Search
CPC ............ C08L 19/02; C08L 9/10; C08L 13/02
USPC ....................................... 523/201
See application file for complete search history.

(56) References Cited

U.S. PATENT DOCUMENTS

| 4,476,285 A | 10/1984 | Crabtree et al. |
| 4,778,851 A | 10/1988 | Henton et al. |
| 4,849,480 A * | 7/1989 | Antonelli et al. ............ 525/303 |
| 5,362,804 A | 11/1994 | Oshima et al. |
| 6,316,527 B1 | 11/2001 | Meyer et al. |
| 8,742,014 B2 * | 6/2014 | Hongo ............................ 525/65 |
| 2006/0191442 A1 | 8/2006 | He et al. |
| 2007/0027263 A1 | 2/2007 | Furukawa et al. |
| 2007/0287799 A1 | 12/2007 | Ha et al. |
| 2009/0065244 A1 | 3/2009 | Kimura et al. |
| 2010/0204404 A1 | 8/2010 | Hongo |
| 2011/0015347 A1 | 1/2011 | Hongo et al. |

FOREIGN PATENT DOCUMENTS

| JP | 5-222140 A | 8/1993 |
| JP | 5-310865 A | 11/1993 |
| JP | 6-192345 A | 7/1994 |
| JP | 7-224144 A | 8/1995 |
| JP | 10-87761 A | 4/1998 |
| JP | 2001-123032 A | 5/2001 |
| JP | 2006-526039 A | 11/2006 |
| JP | 2009-540045 A | 11/2009 |
| JP | 2010-174066 A | 8/2010 |
| WO | 2005/028546 A1 | 3/2005 |
| WO | 2007/125806 A1 | 8/2007 |
| WO | 2009/034966 A1 | 3/2009 |
| WO | 2009/096374 A1 | 8/2009 |

OTHER PUBLICATIONS

International Search Report for PCT/JP2011/080380 dated Apr. 24, 2012.
English Translation of International Preliminary Report on Patentability issued in PCT/JP2011/080380 dated Jul. 10, 2013.
Brandrup, J., et al., "Glass Transition Temperatures of Polymers", Polymer Handbook, vol. 1, No. 258, 1989, 6 pages.
Aldrich, "Table 1: Thermal Transitions of Homopolymers: Glass Transition ($T_g$) & Melting Point ($T_m$) Temperatures", The Link to All Your Polymer Needs, Reference: Polymer Properties, 2011, 2 pages.

* cited by examiner

Primary Examiner — Hannah Pak
(74) Attorney, Agent, or Firm — Sughrue Mion, PLLC (57) ABSTRACT The present invention provides a means for improving the elastic modulus (rigidity), heat resistance, toughness, and impact resistance of a resin to provide these properties in a good balance. The present invention provides a polymer microparticle-dispersed resin composition containing 100 parts by weight of a resin and 0.1 to 150 parts by weight of polymer microparticles each containing at least two layers: a crosslinked polymer layer and a coating polymer layer, the resin composition having a particle dispersity of the polymer microparticles in the resin of not lower than 50%, the crosslinked polymer layer including 50% by weight to 99% by weight of at least one monomer having a Tg, as determined as a homopolymer, of not lower than 0° C., and 50% by weight to 1% by weight of at least one monomer having a Tg, as determined as a homopolymer, of lower than 0° C.

9 Claims, 1 Drawing Sheet

POLYMER MICROPARTICLE-DISPERSED RESIN COMPOSITION AND METHOD FOR PRODUCING SAME

CROSS REFERENCE TO RELATED APPLICATIONS

This application is a National Stage of International Application No. PCT/JP2011/080380 filed Dec. 28, 2011, claiming priority based on Japanese Patent Application Nos. 2011-000776 filed Jan. 5, 2011 and 2011-240879 filed Nov. 2, 2011, the contents of all of which are incorporated herein by reference in their entirety.

TECHNICAL FIELD

The present invention relates to a polymer microparticle-dispersed resin composition, specifically, a polymer microparticle-dispersed resin composition in which polymer microparticles including a crosslinked polymer layer are dispersed in a resin.

BACKGROUND ART

Thermosetting resins such as epoxy resins, vinyl ester resins, unsaturated polyester resins, phenolic resins, bismaleimide resins, and cyanate resins are used in a wide range of applications in various fields because of their excellent features such as heat resistance, mechanical strength, and dimensional accuracy. In particular, epoxy resins, which are excellent in many respects including mechanical strength, electrical insulation properties, heat resistance, and adhesion, are used in various applications including construction materials, electrical and electronic materials, adhesives, and fiber reinforced composite materials. However, cured products thereof have low fracture toughness, and may show extreme brittleness. Their brittleness is problematic in various applications. In addition to improvement in the toughness of resins, improvement in the impact resistance has also been demanded in recent years.

As a method for improving the toughness of an epoxy resin, a method of adding a rubber to the epoxy resin is known. As rubbers to be added, a carboxyl-terminated butadiene-acrylonitrile copolymer rubber (CTBN) and a nitrile rubber have been proposed (e.g. Patent Literature 1). These methods allow a rubber to be dissolved in an epoxy resin composition, and to remain in the epoxy resin composition after cure, and the remaining rubber unfortunately degrades the heat resistance (glass transition temperature: Tg) and elastic modulus of the epoxy resin composition after cure. Another disadvantage is that the morphology of cured products varies depending on curing conditions, and therefore the physical properties are variable.

In order to solve this problem, another proposed method is to use rubbery polymer microparticles that are previously prepared as particles in an aqueous medium by a polymerization technique such as emulsion polymerization or suspension polymerization, and are substantially insoluble in an epoxy resin composition (e.g. Patent Literatures 2 and 3). There are some advantages of this method that the rubber component is previously crosslinked to render it insoluble in the epoxy resin composition, and therefore is less likely to degrade the heat resistance of the resin, and the blending and curing conditions are less likely to affect the state of dispersion. Yet, there remains the problem of essentially degrading the elastic modulus of the resin which is caused by the addition of the rubber component.

In this context, still another proposed method is to add crosslinked polymer microparticles that are free of rubber components to an epoxy resin composition (e.g. prior art document 1). This method improves the fracture toughness almost or completely without degrading the elastic modulus and heat resistance. A disadvantage of this strategy is that addition of such crosslinked polymer microparticles does not improve the impact resistance of the resin.

CITATION LIST

Patent Literature

Patent Literature 1: U.S. Pat. No. 4,476,285
Patent Literature 2: U.S. Pat. No. 4,778,851
Patent Literature 3: WO 2005/028546

Non Patent Literature

Non Patent Literature 1: Colloid Polym. Sci. 274: 342-349 (1996)

SUMMARY OF INVENTION

Technical Problem

The present invention is made in view of the above-mentioned problems, and an object of the present invention is to provide a polymer microparticle-dispersed resin composition having an excellent elastic modulus (rigidity), heat resistance, toughness, and impact resistance in a good balance and that can be a novel method for modifying resin, and a method for preparing such a polymer microparticle-dispersed resin composition.

Solution to Problem

The present inventors intensively studied and found that a specifically structured polymer microparticle-dispersed resin composition exceeds the expectations based on the common theories, and the use of such a polymer microparticle-dispersed resin composition provides a cured product or a polymerized product that has improved fracture toughness and impact strength almost or completely without degrading the elastic modulus (rigidity and hardness) and heat resistance. Thus, the present inventors completed the present invention. Additionally, the present inventors found a method for preparing the specifically structured polymer microparticle-dispersed composition of the present invention.

Specifically, the present invention provides a polymer microparticle-dispersed resin composition, containing: 100 parts by weight of a resin; and 0.1 parts by weight to 150 parts by weight of polymer microparticles each including at least two layers including a crosslinked polymer layer and a coating polymer layer, the resin composition having a particle dispersity of the polymer microparticles in the resin of not lower than 50%, the crosslinked polymer layer including 50% by weight to 99% by weight of at least one monomer having a Tg, as determined as a homopolymer, of not lower than 0° C., and 50% by weight to 1% by weight of at least one monomer having a Tg, as determined as a homopolymer, of lower than 0° C.

In one preferable embodiment, the crosslinked polymer layer includes at least a crosslinked polymer layer including not less than 60% by weight of the monomer having a Tg, as determined as a homopolymer, of not lower than 0° C., and a crosslinked polymer layer including not less than 60% by weight of the monomer having a Tg, as determined as a homopolymer, of lower than 0° C.

In one preferable embodiment, the at least one monomer having a Tg, as determined as a homopolymer, of lower than 0° C. forms at least one polymer selected from the group consisting of diene rubber polymers, acrylic rubber polymers, and organosiloxane rubber polymers.

In one preferable embodiment, the coating polymer layer contains a monomer containing a polymerizable or curable functional group, and the functional group is at least one selected from the group consisting of an epoxy group, an oxetane group, a hydroxyl group, a carbon-carbon double bond, an amino group, an imide group, a carboxylic acid group, a carboxylic acid anhydride group, a cyclic ester group, a cyclic amide group, a benzoxazine group, and a cyanate ester group.

In one preferable embodiment, the polymer microparticles have a number average particle size of 10 to 1000 nm.

In one preferable embodiment, the resin is at least one selected from the group consisting of curable monomers, polymerizable monomers, curable oligomers, polymerizable oligomers, and thermoplastic polymers.

In one preferable embodiment, the monomers or oligomers are organic compounds containing a polymerizable or curable functional group.

In one preferable embodiment, the functional group is at least one selected from the group consisting of an epoxy group, an oxetane group, a hydroxyl group, a carbon-carbon double bond, an amino group, an imide group, a carboxylic acid group, a carboxylic acid anhydride group, a cyclic ester group, a cyclic amide group, a benzoxazine group, and a cyanate ester group.

The present invention further relates to a method for preparing the polymer microparticle-dispersed resin composition, which includes: a first step of mixing an aqueous medium dispersion containing the polymer microparticles dispersed in an aqueous medium with an organic solvent having a water solubility at 20° C. of at least 5% by mass but not more than 40% by mass, and further mixing the mixture with excess water, thereby providing loose aggregates of the polymer microparticles; a second step of separating and recovering the aggregates of the polymer microparticles from the liquid phase, and mixing the aggregates with an organic solvent again, thereby providing a dispersion of the polymer microparticles; and a third step of mixing the dispersion of the polymer microparticles with the resin, and evaporating the organic solvent.

The present invention further relates to a prepreg, including: the polymer microparticle-dispersed resin composition of the present invention; and reinforcing fibers.

The present invention further relates to a fiber reinforced composite material, including a resin and reinforcing fibers, the material being obtained by curing the polymer microparticle-dispersed resin composition of the present invention.

Advantageous Effects of Invention

In the polymer microparticle-dispersed resin composition of the present invention, polymer microparticles having a specific structure are dispersed in a specific state in a resin. This enables cured products and polymerized products of the composition to have remarkably improved toughness and impact strength almost or completely without degrading the elastic modulus (rigidity) and heat resistance. Thus, the polymer microparticle-dispersed resin composition provides cured products or polymerized products having excellent rigidity, heat resistance, toughness, and impact resistance in a good balance.

The polymer microparticle-dispersed resin composition of the present invention is preferably used, in particular, as a matrix resin for fiber reinforced composite materials such as carbon fiber composite materials, or as a curable resin, for example, an epoxy resin that is used as a base material of structural adhesives, and the like, and such use is an effective modification means, and remarkably improves the toughness and impact strength almost or completely without degrading the rigidity and heat resistance.

DESCRIPTION OF EMBODIMENTS

The polymer microparticle-dispersed resin composition of the present invention contains: 100 parts by weight of a resin; and 0.1 parts by weight to 150 parts by weight of polymer microparticles each including at least two layers including a crosslinked polymer layer and a coating polymer layer, the resin composition having a particle dispersity of the polymer microparticles in the resin of not lower than 50%, the crosslinked polymer layer including 50% by weight to 99% by weight of at least one monomer having a Tg, as determined as a homopolymer, of not lower than 0° C., and 50% by weight to 1% by weight of at least one monomer having a Tg, as determined as a homopolymer, of lower than 0° C.

When the resin in the polymer microparticle-dispersed resin composition of the present invention is cured or polymerized product, the polymer microparticle-dispersed resin composition is provided with toughness and impact resistance almost or completely without degrading the elastic modulus and heat resistance of the resin. Thus, the polymer microparticle-dispersed resin composition improves the toughness and impact resistance of the resin almost or completely without degrading the elastic modulus and heat resistance. Specifically, the present inventors found that when the resin in the polymer microparticle-dispersed resin composition is cured or polymerized to form a structure in which the polymer microparticles are dispersed as primary particles in the resin that is solid at ordinary temperature, the toughness and impact resistance of the resin are improved almost or completely without degrading the elastic modulus and heat resistance. Thus, the present invention is based on this finding.

(Resin)

A preferred example of usable resins is at least one selected from the group consisting of curable or polymerizable monomers, curable or polymerizable oligomers, and thermoplastic polymers.

In particular, it is preferable that the resin is at least one selected from the group consisting of curable monomers, polymerizable monomers, curable oligomers, polymerizable oligomers, and thermoplastic polymers, and is liquid at ordinary temperature. In this case, the polymer microparticle-dispersed resin composition of the present invention can be, optionally after diluted with an appropriate polymerizable or curable resin, cured or polymerized into cured products of various shapes which have remarkably improved rigidity and toughness.

Preferred examples of the monomers or oligomers include organic compounds containing a polymerizable or curable functional group, and the polymerizable or curable functional groups is preferably at least one selected from the group consisting of an epoxy group, an oxetane group, a hydroxyl group, a carbon-carbon double bond, an amino group, an imide group, a carboxylic acid group, a carboxylic acid anhydride group, a cyclic ester, a cyclic amide, a benzoxazine group, and a cyanate ester group.

Among these, compounds having any of an epoxy group, an oxetane group, a phenolic hydroxyl group, a cyclic ester, a cyanate ester, a benzoxazine group, and a carbon-carbon double bond are preferable in terms of the range of their potential applications as polymerizable/curable resins, and compounds having an epoxy group (so-called epoxy resins) are particularly preferable. Examples of usable epoxy resins include glycidyl ether-substituted compounds having a known basic skeleton compound such as a bisphenol compound, a hydrogenerated bisphenol compound, a phenol or o-cresol novolac, an aromatic amine, a polycyclic aliphatic or aromatic compound; and compounds having a cyclohexene oxide skeleton. Typically, bisphenol A diglycidyl ether and condensates thereof (so-called bisphenol A epoxy resins) are preferable.

Preferred examples of the thermoplastic polymers include acrylic resins, styrene resins, saturated polyester resins, and polycarbonate resins.

(Polymer Microparticle)

The polymer microparticle-dispersed resin composition of the present invention should contain 0.1 parts by weight to 150 parts by weight of polymer microparticles relative to 100 parts by weight of the resin as described above. The amount of the polymer microparticles is preferably 1 part by weight to 100 parts by weight, and more preferably 2 parts by weight to 50 parts by weight in terms of providing toughness and impact resistance and ensuring the dispersibility of primary particles (which is attributed to the aforementioned properties) and for cost reasons.

As described above, the polymer microparticle-dispersed resin composition of the present invention has a particle dispersity of the polymer microparticles in the resin of not lower than 50%. The expression "polymer microparticles are dispersed as primary particles" used herein means that the particle dispersity is not lower than 50%, and the polymer microparticles do not aggregate, namely they are separated from one another in the resin. The particle dispersity (%) is calculated as described below by the following equation 1. The particle dispersity is preferably not lower than 75%, and more preferably not lower than 90% in terms of improving the toughness.

(Equation 1)

Particle dispersity (%)=$(1-(B_1/B_0))\times 100$  (equation 1)

The sum $B_0$ of the number of unbound polymer microparticles and the number of aggregates consisting of two or more polymer microparticles in contact with each other in a sample under measurement, and the number $B_1$ of aggregates consisting of two or more polymer microparticles in contact with each other are determined, and the particle dispersity is calculated by the above equation 1. A sample and an observation area having a $B_0$ of at least 10 should be chosen.

As described above, the polymer microparticles dispersed as primary particles in the resin produces the effect of improving the toughness and impact resistance. To achieve this, the polymer microparticles should be incompatible with the resin, in other word, should have a crosslinked polymer layer.

The volume average particle size of the polymer microparticles is preferably 10 to 1000 nm, more preferably not smaller than 10 nm and not larger than 500 nm, and still more preferably not smaller than 10 nm and not larger than 300 nm in terms of providing toughness and impact resistance. The volume average particle size of the polymer microparticles can be measured using Microtrac UPA150 (product of Nikkiso Co., Ltd.).

Each polymer microparticle should include a crosslinked polymer layer, and this allows the polymer microparticles to be incompatible with the resin and dispersed as primary particles. The crosslinked polymer layer is a main structure component of the polymer microparticles, and preferably constitutes not less than 40% by weight, more preferably not less than 50% by weight of each polymer microparticle as a whole in terms of improving the toughness and impact resistance. The percentage is preferably not more than 95% by weight, and more preferably not more than 90% by weight. Additionally, each polymer microparticle has one or two or more crosslinked polymer layers in the inside in terms of improving the toughness and impact resistance.

The polymer microparticles further include a coating polymer layer that is the outermost layer for improving the dispersibility in the resin. Such a structure including inner crosslinked polymer layer(s) and an outermost coating polymer layer is called a "core/shell structure", and the crosslinked polymer layer and the coating polymer layer are also called "core layer" and "shell layer", respectively. In order to ensure a sufficient level of the effect of improving the toughness and impact resistance and improve the dispersibility, the coating polymer layer preferably constitutes not more than 50% by weight, and more preferably not more than 45% by weight of each polymer microparticle as a whole. Additionally, the percentage is preferably not less than 5% by weight, and more preferably not less than 10% by weight. In order to improve the toughness and impact resistance, it is preferable that the coating polymer layer is the outermost of the polymer microparticles, and has an average thickness of not more than 20 nm. In order to improve the dispersibility, the average thickness thereof is more preferably 2 nm to 10 nm.

(Crosslinked Polymer Layer)

The crosslinked polymer layer is not limited at all, as long as the crosslinked polymer layer includes a crosslinked polymer containing at least one monomer having a Tg, as determined as a homopolymer, of not lower than 0° C., and at least one monomer having a Tg, as determined as a homopolymer, of lower than 0° C., and the crosslinked polymer contains 50% by weight to 99% by weight of the monomer having a Tg, as determined as a homopolymer, of not lower than 0° C., and 50% by weight to 1% by weight of the monomer having a Tg, as determined as a homopolymer, of lower than 0° C. The crosslinked polymer preferably contains 60% by weight to 99% by weight of the monomer having a Tg, as determined as a homopolymer, of not lower than 0° C., and 40% by weight to 1% by weight of the monomer having a Tg, as determined as a homopolymer, of lower than 0° C., and more preferably contains 65% by weight to 99% by weight of the monomer having a Tg, as determined as a homopolymer, of not lower than 0° C., and 35% by weight to 1% by weight of the monomer having a Tg, as determined as a homopolymer, of lower than 0° C. in terms of improving the toughness and impact resistance almost or completely without degrading the elastic modulus.

The Tg values of homopolymers are available from literatures such as J. Brandrup "POLYMER HANDBOOK Fourth Edition" and catalogues.

In terms of improving the impact resistance, the crosslinked polymer layer preferably includes at least a crosslinked polymer layer including not less than 60% by weight of the monomer having a Tg, as determined as a homopolymer, of not lower than 0° C., and a crosslinked polymer layer including not less than 60% by weight of the monomer having a Tg, as determined as a homopolymer, of lower than 0° C. It is particularly preferable that the crosslinked polymer layer including not less than 60% by weight of the monomer having a Tg, as determined as a homopolymer, of not lower than 0° C. is an inner layer of the crosslinked polymer layer, and the crosslinked polymer layer including not less than 60% by weight of the monomer having a Tg, as determined as a homopolymer, of lower than 0° C. is an outer layer of the crosslinked polymer layer because this structure provides a particularly good balance of the elastic modulus and impact resistance. In this case, the monomer having a Tg, as determined as a homopolymer, of not lower than 0° C. more preferably constitutes not less than 80% by weight, and still more preferably not less than 90% by weight of the inner layer, and the monomer having a Tg, as determined as a homopolymer, of lower than 0° C. more preferably constitutes not less than 80% by weight, and still more preferably not less than 90% by weight of the outer layer.

The crosslinked polymer preferably has a gel content of not less than 70% by mass, more preferably not less than 90% by mass, and particularly preferably not less than 95% by mass. The term "gel content" herein refers to a ratio of insoluble matter relative to the total amount of the insoluble matter and soluble matter in a sample prepared by immersing 0.5 g of aggregated and dried crumbs into 100 g of toluene, leaving the mixture standing at 23° C. for 24 hours, and separating the insoluble matter and the soluble matter.

(Monomer Having a Tg, as Determined as a Homopolymer, of not Lower than 0° C.)

The monomer having a Tg, as determined as a homopolymer, of not lower than 0° C. is at least one selected from, but not limited to, the following monomers: unsubstituted vinyl aromatics such as styrene and 2-vinylnaphthalene; vinyl substituted aromatics such as α-methyl styrene; ring-alkylated vinyl aromatics such as 3-methylstyrene, 4-methylstyrene, 2,4-dimethylstyrene, 2,5-dimethylstyrene, 3,5-dimethylstyrene, and 2,4,6-trimethylstyrene; ring-alkoxylated vinyl aromatics such as 4-methoxystyrene and 4-ethyoxystyrene; ring-halogenated vinyl aromatics such as 2-chlorostyrene and 3-chrolostyrene; ring-ester-substituted vinyl aromatics such as 4-acetoxystyrene; ring-hydroxylated vinyl aromatics such as 4-hydroxystyrene; vinyl esters such as vinyl benzoate and vinyl cyclohexanoate; vinyl halides such as vinyl chloride; aromatic monomers such as acenaphthalene and indene; alkyl methacrylates such as methyl methacrylate, ethyl methacrylate, and isopropyl methacrylate; aromatic methacrylates such as phenyl methacrylate; methacrylates such as isobornyl methacrylate and trimethylsilyl methacrylate; methacryl monomers including derivatives of methacrylic acid such as methacrylonitril; acrylic esters such as isobornyl acrylate and tert-butyl acrylate; and acrylic monomers including derivatives of acrylic acid such as acrylonitrile.

The Tg, as determined as a homopolymer, is preferably not lower than 20° C., more preferably not lower than 50° C., and particularly preferably not lower than 80° C. in terms of preventing rigidity degradation.

(Monomer Having a Tg, as Determined as a Homopolymer, of Lower than 0° C.)

Examples of monomers having a Tg, as determined as a homopolymer, of lower than 0° C. include, but not limited to, monomers constituting a diene rubber polymer, an acrylic rubber polymer, an organosiloxane rubber polymer, a polyolefin rubber (a polymer of an olefin compound), an aliphatic polyester (e.g. polycaprolactone), and a polyether (e.g. polyethylene glycol and polypropylene glycol).

Monomers constituting a diene rubber polymer, an acrylic rubber polymer, or an organosiloxane rubber polymer are more preferable for easy preparation of a crosslinked polymer aqueous dispersion. In particular, monomers from which an acrylic rubber polymer is derived are preferable for easy polymerization in an aqueous environment.

The Tg, as determined as a homopolymer, is preferably lower than −10° C., more preferably lower than −30° C., and particularly preferably lower than −50° C. in terms of improving the impact resistance.

(Diene Rubber Polymer)

The diene rubber polymers are polymers mainly formed from a diene monomer, and may be copolymers polymerized appropriately using later-described other vinyl monomer(s).

Examples of the diene monomer (conjugated diene monomer) include 1,3-butadiene, isoprene, 2-chloro-1,3-butadiene, and 2-methyl-1,3-butadiene. Any of these diene monomers may be used alone, or two or more of these may be used in combination. 1,3-butadiene is particularly preferable.

(Acrylic Rubber Polymer)

The acrylic rubber polymers are polymers mainly formed from an acrylic monomer, and may be copolymers polymerized appropriately using other (meth)acrylic monomer(s) and/or the other vinyl monomer(s).

The acrylic monomer is preferably at least one selected from ethyl acrylate, butyl acrylate, 2-ethyl hexyl acrylate, n-octylacrylate, and 2-phenoxyethyl acrylate because they have a large rubber elasticity, and therefore produce a higher effect of improving the impact resistance. Butyl acrylate (BA) and 2-ethylhexyl acrylate (2-EHA) are particularly preferable.

Examples of the other (meth)acrylic monomers include alkyl (meth)acrylates such as methyl (meth)acrylate, ethyl (meth)acrylate, butyl (meth)acrylate, 2-ethylhexyl (meth)acrylate, octyl (meth)acrylate, dodecyl (meth)acrylate, stearyl (meth)acrylate, and behenyl (meth)acrylate; hydroxyalkyl (meth)acrylates such as 2-hydroxyethyl (meth)acrylate and 4-hydroxybutyl (meth)acrylate; glycidyl (meth)acrylates such as glycidyl (meth)acrylate and glycidyl alkyl (meth)acrylates; alkoxy alkyl (meth)acrylates; allylalkyl (meth)acrylates such as allyl (meth)acrylate and allylalkyl (meth)acrylates; and polyfunctional (meth)acrylates such as monoethylene glycol di(meth)acrylate, triethylene glycol di(meth)acrylate, and tetraethylene glycol di(meth) acrylate. Any of these (meth)acrylates may be used alone, or two or more of these may be used in combination.

The term "(meth)acrylate" used herein refers to acrylate and/or methacrylate.

The diene rubber polymers and acrylic rubber polymers may be copolymers of any of the above monomers (first monomer) and a vinyl monomer (second monomer). Examples of such vinyl monomers include vinylarenes such as styrene, α-methyl styrene, monochlorostyrene, and dichlorostyrene; vinyl carboxylic acids such as acrylic acid and methacrylic acid; vinyl cyanides such as acrylonitrile and methacrylonitril; vinyl halides such as vinyl chloride, vinyl bromide, and chloroprene; vinyl acetate; alkenes such as ethylene, propylene, butylene, and isobutylene; and polyfunctional monomers such as diallyl phthalate, triallyl cyanurate, triallyl isocyanurate, and divinyl benzene. Any of these vinyl monomers may be used alone, or two or more of these may be used in combination. Styrene is particularly preferable.

(Organosiloxane Rubber Polymer)

Preferred examples of the organosiloxane rubber polymers include polysiloxane polymers containing alkyl- or aryl-2-substituted silyloxy units such as dimethyl silyloxy, diethyl silyloxy, methylphenylsilyloxy, or diphenylsilyloxy units. Specific preferred examples include polyorganosiloxane particles prepared by a method such as solution polymerization, suspension polymerization, or emulsion polymerization in the presence of a catalyst such as an acid, an alkali, a salt, or a fluorine compound using cyclic siloxanes such as 1,3,5,7-octamethyl cyclotetrasiloxane (D4), preferably, a monomer for an organosiloxane rubber polymer mainly consisting of a liner or branched organosiloxane oligomer having a weight average molecular weight of 500 to 20,000 or smaller.

In terms of forming a crosslinked structure, the monomer for an organosiloxane rubber polymer preferably include at least one selected from the group consisting of tri- or higher functional alkoxysilanes such as methyltriethoxysilane and tetrapropyloxysilane and tri- or higher functional silane condensates such as methyl orthosilicate, in an amount of 0% by weight to 20% by weight relative to 100% by weight of the monomer for an organosiloxane rubber polymer.

Since incorporation of an aryl substituent or a vinyl group to the organosiloxane rubber polymer facilitates coating with the coating polymer layer, the monomer for an organosiloxane rubber polymer preferably includes a silane compound having a bifunctional hydrolyzable group such as acryloyloxypropyl dimethoxy methyl silane, methacryloyloxypropyl dimethoxy methyl silane, vinyl dimethoxy methyl silane, or vinyl phenyl dimethoxy methyl silane, and a vinyl group as a grafting agent in an amount of 0% by weight to 50% by weight relative to 100% by weight of the monomer for an organosiloxane rubber polymer.

Any methods for incorporating a crosslinked structure to a polymer can be used without limitation, and common methods can be used. One example is that before polymerization of monomers into a polymer such as styrene, a diene rubber polymer, or an acrylic rubber polymer, a crosslinkable monomer such as a polyfunctional monomer (described later) or a mercapto group-containing compound (e.g. mercapto propyl dimethoxy methyl silane) is added to the main component (such as a styrene monomer, a diene monomer, or an acrylic monomer), and then the polymerization is carried out. Incorporation of a crosslinked structure into an organosiloxane rubber polymer can be accomplished by a method of performing polymerization using as part of monomers a polyfunctional alkoxysilane compound, a method in which a reactive group such as a reactive vinyl group or a mercapto group is incorporated into a polysiloxane polymer, and a vinyl polymerizable monomer, an organic peroxide, or the like is added to the resulting polymer to cause a radical reaction, or a method in which a crosslinkable monomer such as a polyfunctional vinyl compound or a mercapto group-containing compound is added to and polymerized with a polysiloxane polymer.

(Polyfunctional Monomer)

Butadiene is not included in the scope of the term "polyfunctional monomer", and examples of the polyfunctional monomer include allylalkyl (meth)acrylates such as allyl (meth)acrylate and allylalkyl (meth)acrylate; polyfunctional (meth)acrylates such as ethylene glycol di(meth)acrylate, 1,3-butanediol di(meth)acrylate, triethylene glycol di(meth)acrylate, tetraethylene glycol di(meth)acrylate, and polypropylene glycol di(meth)acrylate; and diallyl phthalate, triallyl cyanurate, triallyl isocyanurate (TAIL), glycidyl diallylisocyanurate, and divinyl benzene. Allyl methacrylate, triallyl isocyanurate, and divinyl benzene (DVB) are particularly preferable.

Among these, allyl methacrylate (ALMA), TAIC, and diallyl phthalate are particularly preferable for the crosslinked polymer layer in terms of availability, ease of polymerization, and high grafting efficiency of an intermediate polymer layer (the outermost layer among crosslinked polymer layers of the core layer, or a layer between the crosslinked polymer layer including not less than 60% by weight of the monomer having a Tg, as determined as a homopolymer, of not lower than 0° C. and the crosslinked polymer layer including not less than 60% by weight of the monomer having a Tg, as determined as a homopolymer, of lower than 0° C. in the case where the core layer includes these layers) or the coating polymer layer.

(Other Vinyl Monomer)

The other vinyl monomers are vinyl monomers other than the diene monomers, the (meth)acrylic monomers, and the polyfunctional monomers, and examples thereof include vinyl aromatics such as styrene, α-methyl styrene, 1- or 2-vinyl naphthalene, monochlorostyrene, dichlorostyrene, and bromostyrene; alkenes such as ethylene, propylene, butylene, and isobutylene; vinyl cyanides such as (meth)acrylonitrile; and (meth)acrylamide and alkyl vinyl ether. Any of these vinyl monomers may be used alone, or two or more of these may be used in combination.

(Coating Polymer Layer)

The coating polymer layer contains a coating polymer layer polymer that is polymerized from a coating polymer layer component monomer. The coating polymer layer polymer is not limited at all, as long as it improves the dispersibility of the polymer microparticles in the resin, and preferred examples thereof include vinyl polymers obtained by radical polymerization of vinyl group-containing vinyl monomer(s), polyolefins obtained by polymerization of olefin compound(s), silicone polymers obtained by polycondensation of siloxane compound(s), aliphatic polyesters such as polycaprolactone, and polyethers such as polyethylene glycol and polypropylene glycol. Among these, vinyl polymers are preferable for the coating polymer layer because they can be graft polymerized to the crosslinked polymer layer.

In order to bind the polymer microparticles to the resin via a chemical bond to avoid aggregation of the polymer microparticles and maintain the microparticles dispersed well in cured products or polymerized products, the coating polymer layer preferably contains a monomer containing a polymerizable or curable functional group in addition to functional group(s) for the polymer main chain. The polymerizable or curable functional group is preferably at least one selected from the group consisting of an epoxy group, an oxetane group, a hydroxyl group, a carbon-carbon double bond, an amino group, an imide group, a carboxylic acid group, a carboxylic acid anhydride group, a cyclic ester, acyclic amide, a benzoxazine group, and a cyanate ester group. In the case of, for example, a vinyl polymer, the polymer preferably contains a vinyl monomer having the above-mentioned functional group in addition to a vinyl group for the main chain, in an amount of 0.1% by weight to 50% by weight relative to 100% by weight of the coating polymer layer components.

In the case where the resin is, for example, an epoxy resin, the coating polymer layer polymer is preferably a copolymer obtained from a coating polymer layer component containing vinyl monomers for the main chain which are mainly composed of styrene (St), acrylonitrile (AN), and methylmethacrylate (MMA), and vinyl monomers containing a polymerizable or curable group which are mainly composed of glycidyl methacrylate (GMA) in order to avoid aggregation of the microparticles and maintain the microparticles dispersed well.

The polymer in the coating polymer layer preferably has a number average molecular weight of 10000 to 300000, more preferably 10000 to 200000, and still more preferably 10000 to 100000.

(Method for Preparing Polymer Microparticles)

The polymer microparticles each include a coating polymer layer and a crosslinked polymer layer that contains at least one selected from monomers having a Tg, as determined as a homopolymer, of not lower than 0° C., and at least one selected from monomers having a Tg, as determined as a homopolymer, of lower than 0° C. The polymer microparticles can be formed by well-known methods, and typically formed in a common aqueous medium. Specifically, the microparticles are preferably formed by polymerization of monomers in an aqueous medium by at least one method selected from emulsion polymerization, suspension polymerization, miniemulsion polymerization, microemulsion polymerization, and dispersion polymerization. Thus, an aqueous latex is prepared as an aqueous medium dispersion in which polymer microparticles are dispersed in an aqueous medium, and this aqueous medium dispersion is used as a starting material for preparation of the polymer microparticle-dispersed resin composition of the present invention. Among the above polymerization methods, emulsion polymerization, in particular, multi-stage emulsion polymerization is preferable in terms of controlling the structure of polymer microparticles.

The following dispersants can be mentioned as examples of emulsifiers (dispersants) usable in the emulsion polymerization: various acids including alkyl or aryl sulfonic acids such as dioctylsulfosuccinic acid and dodecylbenzenesulfonic acid, alkyl or arylether sulfonic acids, alkyl or arylsulfuric acids such as dodecylsulfuric acids, alkyl or arylether sulfuric acids, alkyl or aryl-substituted phosphoric acids, alkyl or arylether-substituted phosphoric acids, N-alkyl or arylsarcosinic acids such as dodecylsarcosinic acid, alkyl or arylcarboxylic acids such as oleic acid and stearic acid, and alkyl or arylether carboxylic acids, and anionic emulsifiers (dispersants) such as alkali metal salts or ammonium salts of these acids; nonionic emulsifiers (dispersants) such as alkyl or aryl-substituted polyethylene glycols; and derivatives of polyvinyl alcohol, alkyl-substituted celluloses, polyvinyl pyrrolidone, and polyacrylic acid. Any of these emulsifiers (dispersants) may be used alone, or two or more of these may be used in combination.

The amount of the emulsifier (dispersant) is preferably as small as possible, but the dispersion stability of the polymer microparticles in the aqueous latex should be secured. The emulsifier (dispersant) preferably has as high water solubility as possible. An emulsifier (dispersant) having high water solubility can be easily washed out with water, and thus its bad influence on the final polycondensed product can be easily avoided.

(Polymer Microparticle-Dispersed Resin Composition)

As described above, the resin is preferably at least one selected from the group consisting of curable monomers, polymerizable monomers, curable oligomers, polymerizable oligomers, and thermoplastic polymers, in view of achievement of toughness and impact resistance. A polymer microparticle-dispersed resin composition containing, as a medium, at least one selected from these resins, which are liquid at ordinary temperature, can be formed into a solid cured product in which polymer microparticles are dispersed as primary particles at ordinary temperature.

The polymer microparticle-dispersed resin composition of the present invention may optionally contain oxidation inhibitors, ultraviolet absorbers, inorganic fillers, dyes, pigments, diluents, coupling agents, resins other than resins mentioned below as preferable resins, and the like, as long as they do not impair the original mechanical strength and toughness of the resin.

The polymer microparticle-dispersed resin composition of the present invention is preferably used as a polymerizable or curable resin, for example, as an epoxy resin that can be used as a matrix resin for fiber reinforced composite materials such as carbon fiber composite materials or as a base material of structural adhesives or the like. In contrast to conventional techniques, the composition can be an excellent modification means that remarkably improves the toughness and impact strength almost or completely without degrading the properties such as rigidity and heat resistance.

The polymer microparticle-dispersed resin composition of the present invention is suitably used as a molding material, an adhesive, a fiber or filler reinforced composite material, a sealing material, a casting material, an insulating material, a coating material, a filler, a stereolithography material, an optical component, an ink, or a toner.

In the case where the resin is a curable or polymerizable monomer, the polymer microparticle-dispersed resin composition of the present invention can be cured, for example, by known curing methods using an action of a curing agent or a catalyst, heat or light (e.g. ultraviolet rays), or radiation rays (e.g. electron rays), or a combination of these. In this case, as non-limiting examples of molding methods, there may be mentioned transfer molding, injection molding, cast molding, coating and baking, rotary molding, stereolithography, hand lay-up molding using carbon fibers, glass fibers, or the like, prepreg molding, pultrusion, filament winding molding, press molding, resin transfer molding (RTM or VaRTM), and SMC molding.

(Method for Preparing Polymer Microparticle-Dispersed Composition)

As described above, the method for preparing the polymer microparticle-dispersed composition of the present invention includes, in sequence, the first step of obtaining loose aggregates of the polymer microparticles; the second step of obtaining a polymer microparticle dispersion; and the third step of obtaining a polymer microparticle-dispersed composition of the present invention.

More specifically, the polymer microparticle-dispersed resin composition of the present invention is prepared successively through the first step of mixing an aqueous medium dispersion containing polymer microparticles dispersed in an aqueous medium with an organic solvent having a water solubility at 20° C. of at least 5% by mass but not more than 40% by mass, and further mixing the mixture with excess water to aggregate the polymer particles loosely, thereby providing loose aggregates of the polymer microparticles; the second step of separating and recovering the loose aggregates of the polymer microparticles from the liquid phase, and mixing the aggregates with an organic solvent for dispersion again, thereby providing a dispersion of the polymer microparticles in which the polymer microparticles are dispersed in the organic solvent for dispersion; and the third step of mixing the dispersion of the polymer microparticles with the resin, and evaporating the organic solvent for dispersion, thereby providing the polymer microparticle-dispersed resin composition of the present invention.

By this method, an easy-to-handle polymer microparticle-dispersed resin composition in which polymer microparticles are dispersed as primary particles can be easily obtained. Specifically, the method for preparing the polymer microparticle-dispersed resin composition of the present invention is a simple method of preparing a polymer microparticle-dispersed resin composition in which polymer microparticles, the particle size is preferably 10 nm to 1000 nm, are dispersed well in any solid or liquid organic medium.

(First Step: Preparation of Loose Aggregates of Polymer Microparticles)

The first step involves mixing the aqueous medium dispersion and an organic solvent having a water solubility at 20° C. of preferably not lower than 5% by mass and not higher than 40% by mass (preferably not higher than 30% by mass). The use of such an organic solvent causes phase separation (described later) when water is further added to the mixture after this mixing procedure, which allows the polymer microparticles to aggregate into loose aggregates that are loose enough to be re-dispersed.

If the solubility of the organic solvent is lower than 5% by mass, the organic solvent may be slightly less likely to be mixed with the aqueous medium dispersion containing polymer microparticles. If the solubility is higher than 40% by mass, it may be difficult to separate and recover polymer microparticles from the liquid phase (the aqueous phase in many cases) in the second step (described later).

Examples of organic solvents having a water solubility at 20° C. of not lower than 5% by mass and not higher than 40% by mass include ketones such as methyl ethyl ketone, esters such as methyl formate, methyl acetate, and ethyl acetate, ethers such as diethyl ether, ethylene glycol diethyl ether, and tetrahydropyran, acetals such as methylal, and alcohols such as isobutyl alcohol and sec-butyl alcohol. Any of these organic solvents may be used alone, or two or more of these may be used in combination.

The organic solvent used in the first step may be an organic solvent mixture as long as the entire mixture has a water solubility at 20° C. of not lower than 5% by mass and not higher than 40% by mass. There may be mentioned, for example, a mixture of two or more selected from both low water-soluble organic solvents and high water-soluble organic solvents. Examples of the low water-soluble organic solvents include ketones (e.g. methyl propyl ketone, diethyl ketone, methyl isobutyl ketone, and ethyl butyl ketone), esters (e.g. diethyl carbonate, butyl formate, propyl acetate, and butyl acetate), ethers (e.g. diisopropyl ether and dibutyl ether), aliphatic hydrocarbons (e.g. pentane, hexane, heptane, and octane), aromatic hydrocarbons (e.g. benzene, toluene, and xylene) and halogenated hydrocarbons (e.g. methylene chloride and chloroform), and examples of high water-soluble organic solvents include ketones (e.g. acetone, and cyclohexanone), esters (e.g. γ-valerolactone and ethylene glycol monomethyl ether acetate), ethers (e.g. dioxane, ethylene glycol monomethyl ether), alcohols (e.g. ethanol, isopropylalcohol, and t-butylalcohol), and tetrahydrofuran.

For easy removal of the liquid phase (aqueous phase in many cases) in the second step described below, the organic solvent used in the first step is preferably one having a specific gravity of lower than that of water.

The amount of the organic solvent to be mixed with the aqueous latex (aqueous medium dispersion) is preferably not less than 50 parts by mass, and more preferably not less than 60 parts by mass relative to 100 parts by mass of the aqueous latex. The amount is preferably not more than 250 parts by mass, and more preferably not more than 150 parts by mass. If the amount of the organic solvent is less than 50 parts by mass, the polymer microparticles in the aqueous latex are less likely to aggregate. If the amount of the organic solvent is more than 250 parts by mass, more water is required in the subsequent procedure for obtaining loose aggregates of the polymer microparticles, resulting in lower production efficiency.

A known technique can be used for the mixing procedure of the aqueous latex and the organic solvent. For example, a common device such as a stirring tank with a stirring blade may be used, or a static mixer or a line mixer (a system in which a stirrer is incorporated as a part of a pipeline) may be used.

The first step further involves, after the procedure of mixing the aqueous latex and the organic solvent, mixing the mixture with excess water. This procedure results in phase separation, which allows the polymer microparticles to aggregate into loose aggregates. At the same time, almost all electrolytic substances such as the water-soluble emulsifier or dispersant used for the preparation of the aqueous latex, a water-soluble polymerization initiator, and/or a reducing agent are eluted to the aqueous phase.

The amount of water to be used is preferably not less than 40 parts by mass, and more preferably not less than 60 parts by mass relative to 100 parts by mass of the organic solvent mixed with the aqueous latex. Additionally, the amount is preferably not more than 300 parts by mass, and more preferably not more than 250 parts by mass. If the amount of water is less than 40 parts by mass, it is difficult to obtain polymer microparticles as loose aggregates. If the amount of water is more than 300 parts by mass, the organic solvent concentration of the polymer microparticles becomes low, leading to low dispersibility of the polymer microparticles which can be seen as, for example, a prolonged time for re-dispersion of the aggregated polymer microparticles in the second step described below.

(Second Step: Preparation of Dispersion of Polymer Microparticles)

The second step involves a procedure of obtaining a polymer microparticle dope by separating and recovering the aggregated polymer microparticles from the liquid phase. As a result of this procedure, water-soluble foreign substances such as an emulsifier are separated and removed from the polymer microparticles.

In the case where the first step is carried out using a stirring tank, the separation and recovery of the aggregated polymer microparticles from the liquid phase can be accomplished by, for example, a method involving discharging the liquid phase (aqueous phase in many cases) from the bottom part of the stirring tank or a method involving filtering the liquid phase using a filter paper, a filter cloth, or a metal screen with relatively coarse meshes since aggregated polymer microparticles generally float to the surface of the liquid phase.

The amount of the organic solvent in the aggregates of the polymer microparticles (polymer microparticle dope) is preferably not less than 30% by mass, and more preferably not less than 35% by mass of the total mass of the polymer microparticles. Additionally, the amount is preferably not more than 75% by mass, and more preferably not more than 70% by mass. If the amount of the organic solvent is less than 30% by mass, the time period for re-dispersion of the polymer microparticle dope in an organic solvent (described below) may be prolonged, a portion of the aggregates will irreversibly remain, or other problems may arise. If the amount of the organic solvent is more than 75% by mass, a large amount of water is dissolved or contained in the organic solvent, which may cause the polymer microparticles to aggregate in the third step.

Herein, the amount of the organic solvent in the aggregates of the polymer microparticles (polymer microparticle dope) is determined by precisely weighing the aggregates of the polymer microparticles, drying them at 120° C. for 15 minutes, and determining the decreased weight as the organic solvent amount contained in the aggregates.

The second step further involves mixing the aggregates of the polymer microparticles (polymer microparticle dope) with an organic solvent. The aggregates of the polymer microparticles are loose enough to be easily re-dispersed as primary particles in the organic solvent when mixed with the organic solvent.

Examples of the organic solvent used in the second step include those mentioned above as examples of organic solvents usable in the first step. The use of such an organic solvent enables water contained in the polymer microparticles to be azeotropically distilled off with the organic solvent in the third step described below. The organic solvent used in the second step may be different from the organic solvent used in the first step; however, the same organic solvent as that used in the first step is preferably used in terms of further ensuring re-dispersion of the aggregates.

The amount of the organic solvent used in the second step is preferably not less than 40 parts by mass, and more preferably not less than 200 parts by mass relative to 100 parts by mass of the aggregates of the polymer microparticles. The amount is preferably not more than 1400 parts by mass, and more preferably not more than 1000 parts by mass. If the amount of the organic solvent is less than 40 parts by mass, the polymer microparticles are less likely to be dispersed uniformly in the organic solvent, and the resulting dispersion may contain residual masses of aggregated polymer microparticles, or may have high viscosity and therefore may be difficult to handle. If the amount of the organic solvent is more than 1400 parts by mass, larger energy and larger equipment may be uneconomically required to evaporate and remove the organic solvent in the third step described below.

In the present invention, it is preferable to carry out one or more times the step of separating and recovering the aggregated polymer microparticles from the liquid phase, mixing the polymer microparticles with the organic solvent having a water solubility at 20° C. of not lower than 5% by mass and not higher than 40% by mass again, and then further mixing the mixture with excess water to cause the polymer microparticles to aggregate into loose aggregates of the polymer microparticles between the first step and the second step. This further reduces the residual amount of water-soluble foreign substances such as an emulsifier contained in the polymer microparticle dope.

(Third Step: Preparation of Polymer Microparticle-Dispersed Resin Composition)

The third step involves replacing the organic solvent in the dispersion of the polymer microparticles (organic solvent solution) obtained in the second step with the resin. This step provides a polymer microparticle-dispersed resin composition in which the polymer microparticles are dispersed as primary particles. Further, the water remaining in the aggregates of the polymer microparticles can be azeotropically distilled off.

The amount of the resin used in the third step can be properly adjusted based on the desired polymer microparticle concentration in a polymer microparticle-dispersed resin composition to be finally obtained.

The organic solvent can be evaporated by known methods. Examples of such methods include a method involving loading a mixture of the dispersion of the polymer microparticles (organic solvent solution) and the resin into a tank, and heating the mixture under reduced pressure to remove the organic solvent; a method involving counter-flow contact of a drying gas and the mixture described above in a tank; a continuous method using a thin film type evaporator or the like; and a method using an extruder or a continuous stirring tank equipped with an evaporation mechanism. The conditions for evaporation of the organic solvent, such as the temperature and time, can be properly selected not to affect the quality of the polymer microparticle-dispersed resin composition to be obtained. Further, the amount of volatile matter remaining in the polymer microparticle-dispersed resin composition can be properly set not to hinder the use of the polymer microparticle-dispersed resin composition for desired applications.

(Prepreg or Fiber Reinforced Composite Material Formed from Polymer Microparticle-Dispersed Resin Composition)

A combination of the polymer microparticle-dispersed resin composition of the present invention and reinforcing fibers provides a fiber reinforced composite material or a prepreg (precursor thereof) which have remarkably improved toughness and impact strength almost or completely without degrading rigidity, heat resistance, and the like.

Examples of reinforcing fibers usable in the present invention include glass fibers, carbon fibers, aramid fibers, boron fibers, and alumina fibers. Among these, carbon fibers are particularly preferable.

The shape and arrangement of the reinforcing fibers in the present invention are not limited at all, and the fibers may be orientated in the same direction or random directions, or may be arranged in the form of a sheet, a fabric, or a mat. In particular, for applications that require a high specific strength and a high specific elastic modulus, a structure in which fibers are oriented in the same direction is suited, and an easy-to-use fabric structure is also preferably used.

Such a fiber reinforced composite material can be molded by any molding method without limitation, and examples of molding methods include, but are not limited to, hand lay-up molding, prepreg molding, pultrusion, filament winding molding, press molding, RTM, VaRTM, and SMC molding.

EXAMPLES

The following description is offered to illustrate the present invention in more detail with reference to examples and comparative examples, and is not intended to limit the present invention. Various changes and modifications can be appropriately made within the scope of the concept of the entire description, and all such changes and modifications should be understood to be within the scope of the present invention.

(How to Evaluate)

First, how to evaluate polymer microparticle-dispersed resin compositions of examples and comparative examples is illustrated.

[1] Observation of Dispersed Polymer Microparticles with Transmission Electron Microscope A portion of each polymer microparticle-dispersed resin composition was cut out, and polymer microparticles were dyed with ruthenium oxide or osmium oxide. The dyed samples were sliced to obtain ultra-thin sections, and the ultra-thin sections were observed at 10000 and 40000 times magnification with a transmission electron microscope (JEM-1200 EX, product of JEOL Ltd.). The particle dispersity (%) was calculated as described below.

[2] Measurement of Average Particle Size and Distribution of Particle Size

Aqueous latexes and the polymer microparticle-dispersed resin compositions were measured for the volume average particle size (Mv) and the number average particle size (Mn) of polymer microparticles dispersed therein using Microtrac UPA 150 (product of Nikkiso Co., Ltd.). The aqueous latexes and the liquid resin compositions were diluted, respectively, with deionized water and methyl ethyl ketone to prepare samples for the measurement. For the measurement, the refractive index of water or methyl ethyl ketone and the refractive index of polymer particles of each kind were input, and the sample concentration was adjusted such that the following conditions were met: the measurement period was 600 seconds; and the signal level was 0.6 to 0.8. The distribution was calculated as Mv/Mn from the values Mv and Mn.

[3] Calculation of Particle Dispersity

Four 5 cm-square areas were randomly selected on a photograph taken with a transmission electron microscope at 40000 times magnification, to calculate the particle dispersity (%), and the obtained particle dispersities were averaged.

The particle dispersity (%) was calculated by determining the sum $B_0$ of the number of unbound polymer microparticles and the number of aggregates consisting of two or more polymer microparticles in contact with each other in a sample under measurement, and the number $B_1$ of aggregates consisting of two or more polymer microparticles in contact with each other, and calculating the following equation.

$$\text{Particle dispersity (\%)}=(1-(B_1/B_0))\times 100 \quad \text{(equation 1)}$$

[4] Flexural Modulus Test

A test piece (length: 100 mm, width (b): 10 mm, thickness (h): 5 mm) was cut out from a cured plate sample, and aged at 23° C. for 48 hours. Then, the sample was subjected to a three-point bending test using an autograph, AG-2000E (product of Shimadzu Corp.) under the following conditions: span length (L)=80 mm; and test speed=2 mm/min (JIS K7171). The initial slope (F/e) of the obtained load (F) vs. deflection (e) curve was determined, and the flexural modulus (E) was calculated by the following equation 2. The unit of (F/e) is "kN/mm", and all the units of L, b, and h are "mm".

(Equation 2)

$$E(GPa)=L^3\times(F/e)/(4\times b\times h^3) \quad \text{(equation 2)}$$

[5] Measurement of Fracture Toughness

A test sample (length: 2.5 inches, width (b): 0.5 inches, thickness (h): 5 mm) was cut out form a cured plate sample, and a V-shaped notch was formed on the test sample using a notching machine. Then, a crack was made from the tip of the V shape to the center of the sample with a razor blade. The test sample was aged at 23° C. for 48 hours, and subjected to a three-point bending test using an autograph, AG-2000E (product of Shimadzu Corp.) under the following conditions: span length (L)=50 mm; and test speed=1 ram/min. The fracture toughness Klc (MPa·m$^{1/2}$) was calculated by the following equations 3 and 4 using the maximum strength F (kN) determined by the bending test. In the equations, a is the sum of the depth of the V notch and the distance from the tip of the V notch to the crack front, and all the units of L, h, a, and b are "cm" (ASTM D5045).

(Equation 3)

$$K1c=(F\times L/(h\times b^{3/2}))\times f \quad \text{(equation 3)}$$

(Equation 4)

$$f=3(a/b)^{1/2}\times AA/BB$$

$$AA=1.99-(a/b)\{1-(a/b)\}\{2.15-3.93(a/b)+2.7(a/b)^2)\}$$

$$BB=2\{1+2(a/b)\}\{1-(a/b)\}^{3/2} \quad \text{(equation 4)}$$

[6] Measurement of impact strength (DuPont impact strength)

A test sample (length and width: 4 cm, thickness: 3 mm) was cut out from a cured plate sample, and aged at 23° C. for 48 hours. The 50% breaking height was determined by performing a test in accordance with JIS K 7211 using Dupont Impact Tester (product of Yasuda Seiki seisakusho LTD.) with a 500-g weight and a punch with a radius of ¼ inch.

[7] Measurement of Glass Transition Temperature

A sample (each side of which was not longer than 0.5 mm) was cut out from a cured plate sample, and an about 10 mg portion thereof was put on a measurement container of a differential scanning calorimetry, DSC 220C (product of Seiko Instruments Inc.), and measured for glass transition temperature at a temperature increasing rate of 10° C./min (JIS K 7121). The extrapolated onset glass transition temperature was defined as the glass transition temperature.

(Preparation 1)

Preparation of Polymer Microparticle-Containing Aqueous Latex: Diene Rubber Polymer In a pressure-resistant polymerization reactor, 200 parts by mass of deionized water, 0.03 parts by mass of tripotassium phosphate, 0.002 parts by mass of disodium ethylenediaminetetraacetate (EDTA), 0.001 parts by mass of ferrous sulfate heptahydrate, and 1.55 parts by mass of sodium dodecylbenzenesulfonate (SDBS) were charged, and stirred while sufficiently purging with nitrogen to remove oxygen. Then, 100 parts by mass of butadiene (Bd) was fed to the system, and the mixture was heated to 45° C. To this, 0.03 parts by mass of paramenthane hydroperoxide (PHP), and then 0.10 parts by mass of sodium formaldehyde sulfoxylate (SFS) were added to initiate polymerization. Additionally, 0.025 parts by mass of PHP was added after 3, 5, and 7 hours from the start of polymerization. Also, 0.0006 parts by mass of EDTA and 0.003 parts by mass of ferrous sulfate heptahydrate were added after 4, 6, and 8 hours from the start of polymerization. After 15 hours from the start of polymerization, remaining monomers were distilled off and removed under reduced pressure to stop the polymerization, and consequently, an aqueous latex including a crosslinked polymer layer mainly made of polybutadiene was obtained. Polymer microparticles in the obtained aqueous latex (R-1) had a crosslinked polymer layer having a volume average particle size of 90 nm.

In a glass reactor equipped with a thermometer, a stirrer, a reflux condenser, a nitrogen flow-inlet, and a monomer feeder, 255 parts by mass of the aqueous latex including a crosslinked polymer layer mainly made of polybutadiene (corresponding to 83 parts by mass of polybutadiene rubber particles) and 58 parts by mass of deionized water were charged, and stirred at 60° C. while purging with nitrogen. After 0.004 parts by mass of EDTA, 0.001 parts by mass of ferrous sulfate heptahydrate, and 0.2 parts by mass of SFS were added, a mixture of 5.4 parts by mass of styrene (St), 3.9 parts by mass of acrylonitrile (AN), 0.8 parts by mass of methyl methacrylate (MMA), 6.9 parts by mass of glycidyl methacrylate (GMA), and 0.05 parts by mass of cumene hydroperoxide (CHP) were continuously added over 200 minutes. After they were all added, 0.04 parts by mass of CHP was further added, and the mixture was stirred for one hour to complete polymerization. In this manner, an aqueous latex (L-1) containing polymer microparticles was obtained. The polymerization conversion ratios of the monomer components were not lower than 99%. Polymer microparticles in the obtained aqueous latex had a volume average particle size of 100 nm.

(Preparation 2)
Preparation of Polymer Microparticle-Containing Aqueous Latex: Styrene Polymer 1

In a glass reactor equipped with a thermometer, a stirrer, a reflux condenser, a nitrogen flow-inlet, and a feeder for monomers and an emulsifier, 182 parts by mass of deionized water, 0.006 parts by mass of EDTA, 0.0015 parts by mass of ferrous sulfate heptahydrate, 0.2 parts by mass of SFS, and 0.15 parts by mass of SDBS were charged, and heated to 60° C. under stirring while purging with nitrogen. To this mixture, a mixture of 83 parts by mass of St, 1.56 parts by mass of allylmethacrylate (ALMA), and 0.024 parts by mass of CHP was continuously added dropwise over 200 minutes. After the whole mixture was added, the resulting mixture was stirred for 0.5 hours to complete polymerization. Consequently, an aqueous latex (R-2) including a crosslinked polymer layer of polymer microparticles was obtained. Then, a mixture of 5.4 parts by mass of St, 3.9 parts by mass of AN, 0.8 parts by mass of MMA, 6.9 parts by mass of GMA, and 0.05 parts by mass of CHP was continuously added to the latex over 200 minutes. After the addition, 0.04 parts by mass of CHP was further added, and the mixture was stirred for one hour to complete polymerization. In this manner, an aqueous latex (L-2) containing polymer microparticles was obtained. The polymerization conversion ratios of the monomer components were not lower than 99%. Polymer microparticles in the obtained aqueous latex had a volume average particle size of 122 nm.

(Preparation 3)
Preparation of Aqueous Latex Containing Polymer Microparticles: Acrylic Polymer 1

An aqueous latex (L-3) containing polymer microparticles was prepared in the same manner as in Preparation 2, except that 83 parts by mass of MMA was used instead of 83 parts by mass of St. All the polymerization conversion ratios of the monomer components were not lower than 99%. Polymer microparticles in the obtained aqueous latex had a volume average particle size of 89 nm.

(Preparation 4)
Preparation of Aqueous Latex Containing Polymer Microparticles: Acrylic Polymer 2

An aqueous latex (L-4) containing polymer microparticles was prepared in the same manner as in Preparation 2, except that a mixture of 58 parts by mass of MMA and 25 parts by mass of butyl acrylate (BA) was used instead of 83 parts by mass of St. All the polymerization conversion ratios of the monomer components were not lower than 99%. Polymer microparticles in the obtained aqueous latex had a volume average particle size of 99 nm.

(Preparation 5)
Preparation of Aqueous Latex Containing Polymer Microparticles: Acrylic Polymer 3

An aqueous latex (L-5) containing polymer microparticles was prepared in the same manner as in Preparation 2, except that a mixture of 58 parts by mass of MMA, 1.09 parts by mass of ALMA, and 0.017 parts by mass of CHP was continuously added dropwise over 140 minutes, and after 0.5 hours, a mixture of 25 parts by mass of BA, 0.47 parts by mass of ALMA, and 0.007 parts by mass of CHP was continuously added dropwise over 60 minutes instead of continuously adding dropwise the mixture of 83 parts by mass of St, 1.56 parts by mass of ALMA, and 0.024 parts by mass of CHP over 200 minutes. All the polymerization conversion ratios of the monomer components were not lower than 99%. Polymer microparticles in the obtained aqueous latex had a volume average particle size of 95 nm.

(Preparation 6)
Preparation of Aqueous Latex Containing Polymer Microparticles: Styrene Polymer 2

An aqueous latex (L-6) containing polymer microparticles was prepared in the same manner as in Preparation 2, except that a mixture of 73 parts by mass of St and 10 parts by mass of 2-ethyl hexyl acrylate (2EHA) was used instead of 83 parts by mass of St. All the polymerization conversion ratios of the monomer components were not lower than 99%. Polymer microparticles in the obtained aqueous latex had a volume average particle size of 99 nm.

(Preparation 7)
Preparation of Aqueous Latex Containing Polymer Microparticles: Styrene Polymer 3

An aqueous latex (L-7) containing polymer microparticles was prepared in the same manner as in Preparation 2, except that a mixture of 73 parts by mass of St, 1.37 parts by mass of ALMA, and 0.021 parts by mass of CHP were continuously added dropwise over 175 minutes, and after 0.5 hours, a mixture of 10 parts by mass of 2EHA, 0.19 parts by mass of ALMA, and 0.003 parts by mass of CHP was continuously added dropwise over 25 minutes instead of continuously adding dropwise the mixture of 83 parts by mass of St, 1.56 parts by mass of ALMA, and 0.024 parts by mass of CHP over 200 minutes. All the polymerization conversion ratios of the monomer components were not lower than 99%. Polymer microparticles in the obtained aqueous latex had a volume average particle size of 123 nm.

Table 1 shows the monomer compositions of Preparations 1 to 7 together.

TABLE 1

| | Particle size (nm) | Crosslinked polymer layer | | Coating polymer layer (parts by mass) | | | |
|---|---|---|---|---|---|---|---|
| | | Composition | (parts by mass) | St | AN | MMA | GMA |
| Preparation 1 | 100 | Bd | 83 | 5.4 | 3.9 | 0.8 | 6.9 |
| Preparation 2 | 122 | St/ALMA | 83/1.56 | 5.4 | 3.9 | 0.8 | 6.9 |

TABLE 1-continued

|  | Particle size (nm) | Crosslinked polymer layer | | Coating polymer layer (parts by mass) | | | |
|---|---|---|---|---|---|---|---|
|  |  | Composition | (parts by mass) | St | AN | MMA | GMA |
| Preparation 3 | 89 | MMA/ALMA | 83/1.56 | 5.4 | 3.9 | 0.8 | 6.9 |
| Preparation 4 | 99 | MMA/BA/ALMA | 58/25/1.56 | 5.4 | 3.9 | 0.8 | 6.9 |
| Preparation 5 | 95 | MMA/ALMA-BA/ALMA | 58/1.09-25/0.47 | 5.4 | 3.9 | 0.8 | 6.9 |
| Preparation 6 | 99 | St/2EHA/ALMA | 73/10/1.56 | 5.4 | 3.9 | 0.8 | 6.9 |
| Preparation 7 | 123 | St/ALMA-2EHA/ALMA | 73/1.37-10/0.19 | 5.4 | 3.9 | 0.8 | 6.9 |

Comparative Example 1

A liquid resin composition was prepared by mixing well 97.6 g of a liquid bisphenol A epoxy resin ("JER 828EL", product of JER, epoxy equivalent weight; 187 g/eq) and 32.4 g of diaminodiphenylsulfone (curing agent, "Aradur 9664-1", product of Huntsman, active amine equivalent weight; 62 g/eq) at a constant temperature of 130° C., and defoaming the mixture. This liquid resin composition was charged between two glass plates spaced therebetween with a 5-mm thick spacer, and cured in a hot air oven at 150° C. for 1 hour, and then at 180° C. for 2 hours. In this manner, a 5-mm thick cured plate 1 was obtained. Table 2 shows the physical property values of the cured plate 1.

Comparative Example 2

A liquid resin composition was prepared by mixing well 16.25 g of a bisphenol A epoxy adduct of carboxyl group-terminated butadiene-acrylonitrile copolymer rubber (CTBN) ("EPON 58006", product of Hexion, CTBN content: 40 wt %) 82.95 g of a liquid bisphenol A epoxy resin, JER 828EL, and 30.8 g of diaminodiphenylsulfone, Aradur 9664-1 (curing agent) at a constant temperature of 130° C., and then defoaming the mixture. This liquid resin composition was charged between two glass plates spaced therebetween with a 5-mm thick spacer, and cured in a hot air oven at 150° C. for 1 hour, and then at 180° C. for 2 hours. In this manner, a 5-mm thick cured plate 2 was obtained. Table 2 shows the physical property values of the cured plate Comparative Example 3

In a 1-L stirring tank at 30° C., 126 parts by mass of methyl ethyl ketone (MEK) was charged, and then 126 parts by mass of the aqueous latex (L-1) containing polymer microparticles obtained in Preparation 1 was also charged under stirring. After homogeneously mixing them, 200 parts by mass of water was added at a feeding rate of 80 parts by mass/min (the total amount: 452 parts by mass). Immediately after the whole amount was added, the stirring was stopped. Thus, a slurry containing buoyant aggregates was obtained. Next, 350 parts by mass of the liquid phase was discharged through a discharge port at a lower portion of the tank, while leaving the aggregates. To the obtained aggregates (polymer microparticle dope), 150 parts by mass of MEK was added and mixed (the remaining amount: 252 parts by mass). In this manner, an organic solvent solution containing polymer microparticles dispersed therein was obtained. To 71.6 parts by mass of this organic solvent solution (containing 11.1 parts by weight of polymer microparticles), 100 parts by mass of a liquid bisphenol A epoxy resin JER 828EL was added and mixed, and then MEK was evaporated under reduced pressure. Consequently, a bisphenol A epoxy resin containing polymer microparticles dispersed therein was obtained as a polymer microparticle-dispersed resin composition 1.

A resin composition was prepared by mixing well 65 g of this polymer microparticle-dispersed resin composition 1 (epoxy equivalent weight; 208 g/eq) (containing 6.5 g of polymer microparticles), 34.2 g of JER 828EL, and 30.8 g of diaminodiphenylsulfone (curing agent, Aradur 9664-1) at a constant temperature of 130° C. (the mixture contained 5% by weight of polymer microparticles), and defoaming the mixture. This liquid resin composition was charged between two glass plates spaced therebetween with a 5-mm thick spacer, and cured in a hot air oven at 150° C. for 1 hour, and then at 180° C. for 2 hours. Consequently, a 5-mm thick cured plate 3 was obtained. Table 2 shows the physical property values of this cured plate 1.

Comparative Examples 4 to 5, Examples 1 to 4

Bisphenol A epoxy resins containing polymer microparticles dispersed therein were obtained as polymer microparticle-dispersed resin compositions 2 to 7 in the same manner as in Comparative Example 3, except that the aqueous latexes (L-2 to L-7) of polymer microparticles prepared in Preparations 2 to 7 were used instead of the aqueous latex L-1 used in Comparative Example 3. Subsequently, cured plates 4 to 9 were obtained in the same manner as in Comparative Example 3 from the polymer microparticle-dispersed resin compositions 2 to 7, respectively. The obtained cured plates 4 to 9 correspond to Comparative Examples 4 to 5 and Examples 1 to 4, respectively. Table 2 shows the physical property values of the cured plates 4 to 9.

TABLE 2

|  | Particle size (nm) | Flexural modulus (GPa) | Fracture toughness K1c (MPa·m$^{1/2}$) | DuPont impact strength 50% breaking height (cm) | Glass transition temperature (° C.) |
|---|---|---|---|---|---|
| Comparative Example 1 | No particle | 2.77 | 0.59 | 37.8 | 184 |
| Comparative Example 2 | No particle | 2.60 | 0.89 | 34.8 | 168 |

TABLE 2-continued

| | Particle size (nm) | Flexural modulus (GPa) | Fracture toughness K1c (MPa·m$^{1/2}$) | DuPont impact strength 50% breaking height (cm) | Glass transition temperature (° C.) |
|---|---|---|---|---|---|
| Comparative Example 3 | 100 | 2.57 | 0.95 | 67.1 | 184 |
| Comparative Example 4 | 122 | 2.93 | 0.96 | 44.0 | 182 |
| Comparative Example 5 | 89 | 2.97 | 0.78 | 40.7 | 181 |
| Example 1 | 99 | 2.78 | 0.89 | 49.3 | 183 |
| Example 2 | 95 | 2.86 | 0.90 | — | 182 |
| Example 3 | 99 | 2.84 | 0.97 | — | 181 |
| Example 4 | 123 | 2.85 | 0.98 | 53.3 | 182 |

Comparative Example 1

As seen in Table 2, the resin free of reinforcing materials was apparently poor in fracture toughness and impact strength.

Comparative Example 2

As seen in Table 2, the elastic modulus and glass transition temperature were unfavorably lower than those of Comparative Example 1 although the fracture toughness was improved compared to Comparative Example 1. Additionally, the impact strength was not improved. Thus, the results revealed that this example is not satisfactory.

Comparative Example 3

As seen in Table 2, the elastic modulus was worse than that of Comparative Example 1 although the fracture toughness and impact strength were improved without degrading the glass transition temperature. Thus, the results revealed that this example is not satisfactory.

Comparative Examples 4 to 5

As seen in Table 2, the impact strength was not improved very much compared to that of Comparative Example 1 although the fracture toughness was improved without degrading the elastic modulus and glass transition temperature. Thus, the results revealed that this example is not satisfactory.

Examples 1 to 4

As seen in Table 2, the fracture toughness and impact strength were improved compared to those of Comparative Example 1 without degrading the elastic modulus and glass transition temperature. The results revealed that Example 4, among others, showed high fracture toughness and impact strength, and was excellent in the balance of the physical properties.

Figure 1:
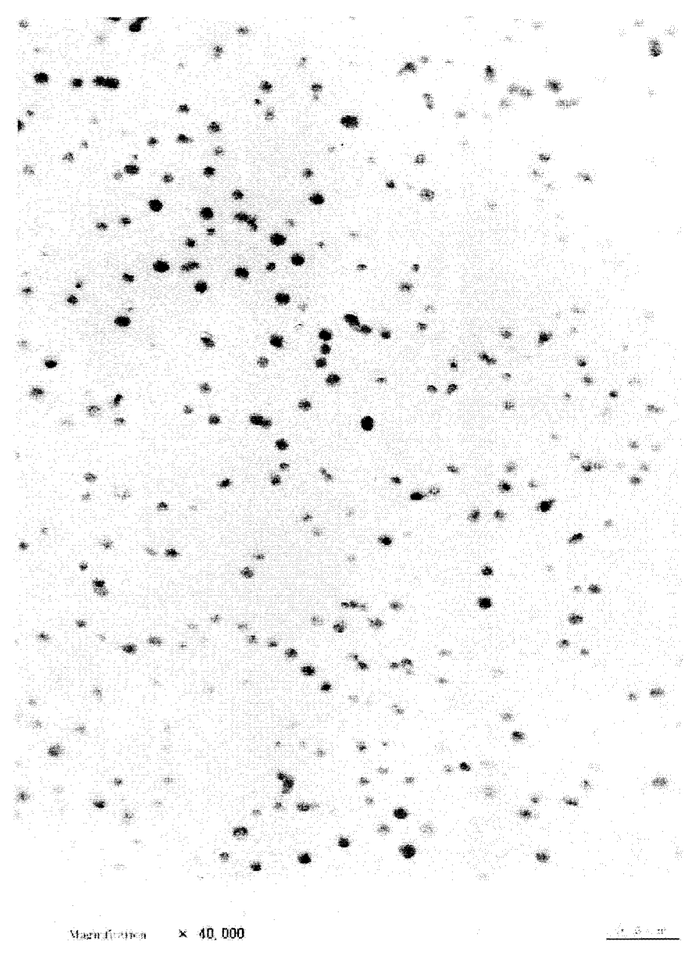
FIG. 1 is a transmission electron microscope photograph of a cured plate of Example 4.

The cured plate obtained in Example 4 was treated by the above-mentioned method, specifically was cut with a microtome to obtain an ultra-thin section sample, and the sample was dyed with ruthenium oxide, and observed with a transmission electron microscope to evaluate dispersed polymer microparticles and calculate the particle dispersity. The microscope photograph was shown as FIG. 1. The particle dispersity was 89%. Specifically, it was confirmed that polymer microparticles were not agglomerated and were dispersed as primary particles in the polymer microparticle-dispersed composition.

[Evaluation of Carbon Fiber Reinforced Composite Material (CFRP) System]

The following description is offered to illustrate how to evaluate CFRPs including the polymer microparticle-dispersed resin compositions of Examples and Comparative Examples and carbon fibers, and the results of the evaluation.

(1) Preparation of Resin

Prepreg Resin Composition 1

A prepreg composition 1 was prepared by stirring 45 parts by weight of a liquid bisphenol A epoxy resin ("Epo Tohto YD-128", product of Nippon Steel Chemical Co., Ltd., epoxy equivalent weight; 189 g/eq), 25 parts by weight of a solid bisphenol A epoxy resin ("Epo Tohto YD-012", product of Nippon Steel Chemical Co., Ltd., epoxy equivalent weight; 650 g/eq), and 30 parts by weight of an o-cresol novolac epoxy resin ("Epo Tohto YDCN-700-7", Nippon Steel Chemical Co., Ltd., epoxy equivalent weight; 202 g/eq) together at 100° C., cooling the mixture to 70° C., and adding 4.0 parts by weight of dicyandiamide (product of JER "jER cure DICY7") and 2.5 parts by weight of 3-(3,4-dichlorophenyl)-1,1-dimethylurea (DCMU, product of Tokyo Chemical Industry Co., Ltd.) thereto and stirring and mixing the mixture.

Prepreg Resin Composition 2

A bisphenol A epoxy resin containing polymer microparticles dispersed therein was prepared as a polymer microparticle-dispersed resin composition 8 (containing 25% by weight of polymer microparticles) in the same manner as in Comparative Example 3, except that the amount of the organic solvent solution was changed from 71.6 parts by mass (containing 11.1 parts by weight of polymer microparticles) to 214.8 parts by mass (containing 33.3 parts by weight polymer), and Epo Tohto YD-128 was used instead of JER 828EL. Then, a prepreg resin composition 2 was prepared by stirring and mixing 40 parts by weight of the polymer microparticle-dispersed resin composition 8, 15 parts by weight of Epo Tohto YD-128, 25 parts by weight of Epo Tohto YD-012, and 30 parts by weight of Epo Tohto YDCN-700-7 together at 100° C., cooling the mixture to 70° C., and adding 4.0 parts by weight of jER cure DICY7 and 2.5 parts by weight of DCMU thereto and stirring and mixing the mixture.

Prepreg Resin Composition 3

A bisphenol A epoxy resin containing polymer microparticles dispersed therein was prepared as a polymer microparticle-dispersed resin composition 9 (containing 25% by weight of polymer microparticles) in the same manner as in Comparative Example 3, except that the aqueous latex (L-7) of polymer microparticles obtained in Preparation 7 was used instead of the aqueous latex (L-1) of polymer microparticles obtained in Preparation 1, the amount of the organic solvent solution was changed from 71.6 parts by mass (containing 11.1 parts by weight of polymer microparticles) to 214.8 parts by mass (containing 33.3 parts by weight of polymer microparticles), and Epo Tohto YD-128 was used instead of JER 828EL. A prepreg resin composition 3 was prepared by stirring and mixing 40 parts by weight of the polymer microparticle-dispersed resin composition 9, 15 parts by weight of Epo Tohto YD-128, 25 parts by weight of Epo Tohto YD-012, and 30 parts by weight of Epo Tohto YDCN-700-7 together at 100° C., cooling the mixture to 70° C., and adding 4.0 parts by weight of jER cure DICY7 and 2.5 parts by weight of DCMU and stirring and mixing the mixture.

VaRTM Resin Composition 1

A VaRTM resin composition 1 was prepared by mixing 100 parts by weight of Epo Tohto YD-128, 85 parts by weight of methylnadic anhydride (NMA, Wako Pure Chemical Industries, Ltd.), and 1.0 part by weight of 2-ethyl-4-methyl imidazole ("CUREZOL 2E4MZ", product of SHIKOKU CHEMICALS CORPORATION).

VaRTM Resin Composition 2

A VaRTM resin composition 2 was prepared by mixing 36 parts by weight of the polymer microparticle-dispersed resin composition 8 obtained in the process of preparation of the prepreg resin composition 2, 64 parts by weight of Epo Tohto YD-128, 77 parts by weight of NMA, and 0.9 parts by weight of CUREZOL 2E4MZ.

VaRTM Resin Composition 3

A VaRTM resin composition 3 was prepared by mixing 36 parts by weight of the polymer microparticle-dispersed resin composition 9 obtained in the process of preparation of the prepreg resin composition 3, 64 parts by weight of Epo Tohto YD-128, 77 parts by weight of NMA, and 0.9 parts by weight of CUREZOL 2E4MZ.

(2) Preparation of Prepreg

The prepreg resin compositions 1 to 3 prepared in the process (1) were each coated onto a release sheet using a knife coater in an amount of 90 g/m². Thus, resin films were obtained. Next, carbon fibers ("TORAYCA T700SC-12K", product of Toray Industries, Inc.) were arranged in the same orientation on each resin film using a drum winder, and heated at 110° C. under increased pressure to allow the carbon fibers to be impregnated with the resin. In this manner, unidirectional prepregs 1 to 3 having a carbon fiber weight of 170 g/m² and a resin content of 32.0% were obtained.

(3) How to Measure Mode I Interlaminar Fracture Toughness (G1c)

Carbon fibers ("ECS6090", product of Saertex) were stacked with a [(0/90)]$_{5s}$ configuration (a Teflon-coated polyimide film ("Kapton 120HR616", product of DU PONT-TORAY CO., LTD.) was inserted on a portion of exactly the middle layer in this configuration). Each of the VaRTM resin compositions 1 to 3 obtained in the process (1) was poured onto the stack by VaRTM method, and cured at 80° C. for 2 hours, and then post-cured at 135° C. for 4 hours. Thus, CFRPs 1 to 3 having a thickness of 2.8 mm were obtained. The obtained CFRPs were each cut into a 21.5-mm wide and 140-mm long sample in which the polyimide film insertion part was 45 mm long from the edge. Then, the polyimide film was removed. Subsequently, a wedge was hit with a plastic hammer at the opening of the film insertion part, so that a precrack having a length of about 2 mm was formed. In this manner, samples for the mode I interlaminar fracture toughness test were obtained.

The test was performed in accordance with JIS K 7086. The term "Teflon" is a registered trademark (hereinafter the same).

(4) How to Measure Mode II Interlaminar Fracture Toughness (G2c)

The unidirectional prepregs 1 to 3 obtained in the process (2) were each cut into pieces of a predetermined size, and 24 pieces of each prepreg were stacked in the same orientation (Kapton 120HR616 was inserted on a portion of exactly the middle layer (the 12th layer) in this configuration), wrapped with a Teflon-coated PET film, and cured at 125° C. for 1 hour using a press molder under a pressure of 3 kg/cm². In this manner, unidirectional CFRPs having a fiber volume content (Vf) of 53% and a thickness of 3 mm were obtained. The unidirectional CFRPs were each cut into a sample having a width of 21.5 mm (in the direction perpendicular to the fiber orientation) and a length of 140 mm (in the direction parallel to the fiber orientation) in which the polyimide film insertion part was 45 mm long from the edge. Then, the polyimide film was removed. Subsequently, a wedge was hit with a plastic hammer at the opening of the film insertion part, so that a precrack having a length of about 2 mm was formed. In this manner, samples for the mode II interlaminar fracture toughness test (unidirectional CFRPs 1 to 3) were obtained. The test was performed in accordance with JIS K 7086.

(5) How to Measure 0° Flexural Modulus

The unidirectional prepregs 1 to 3 obtained in the process (2) were each cut into pieces of a predetermined size, and 16 pieces of each prepreg were stacked in the same orientation, wrapped with a Teflon-coated PET film, and cured at 125° C. for 1 hour using a press molder under a pressure of 3 kg/cm². In this manner, unidirectional CFRPs having a fiber volume content (Vf) of 53% and a thickness of 2 mm were obtained. Each unidirectional CFRP was cut into a sample having a width of 15 mm (in the direction perpendicular to the fiber orientation) and a length of 100 mm (in the direction parallel to the fiber orientation). In this manner, samples for the 0° flexural modulus test (unidirectional CFRPs 4 to 6) were obtained. The test was performed in accordance with JIS K 7074.

(6) How to Measure 90° Flexural Modulus

Unidirectional CFRPs were obtained in the same manner as in the process (5), and cut into samples having a length of 15 mm (in the direction parallel to the fiber orientation) and a width of 100 mm (in the direction perpendicular to the fiber orientation). In this manner, samples for the 90° flexural modulus test (unidirectional CFRPs 7 to 9) were obtained. The test was performed in accordance with JIS K 7074.

Comparative Examples 6 to 7, Example 5

The CFRP 1 and the unidirectional CFRPs 1, 4, and 7 correspond to Comparative Example 6, the CFRP 2 and the unidirectional CFRPs 2, 5, and 8 correspond to Comparative Example 7, and the CFRP3 and the unidirectional CFRPs 3, 6, and 9 correspond to Example 5. Table 3 shows their physical property values.

TABLE 3

| | Polymer microparticle | G1c (J/m²) | G2c (J/m²) | 0° flexural modulus (GPa) | 90° flexural modulus (GPa) |
|---|---|---|---|---|---|
| Comparative Example 6 | No particle | 234 | 373 | 105 | 7.42 |

TABLE 3-continued

| Polymer microparticle | G1c (J/m²) | G2c (J/m²) | 0° flexural modulus (GPa) | 90° flexural modulus (GPa) |
|---|---|---|---|---|
| Comparative Example 7 | Particles prepared in Preparation 1 | 408 | 449 | 105 | 6.85 |
| Example 5 | Particles prepared in Preparation 7 | 376 | 441 | 102 | 7.34 |

Comparative Example 6

As seen in Table 3, the CFRP free of reinforcing materials was found to have a low G1c and G2c.

Comparative Example, 7

As seen in Table 3, the 90° flexural modulus was poor compared to that of Comparative Example 6 although the G1c and G2c were improved. The 0° flexural modulus, which is assumed to reflect the physical properties of the carbon fibers, was equivalent to that of Comparative Example 6.

Example 5

As seen in Table 3, the G1c and G2c were improved compared to those of Comparative Example 6, and the 0° flexural modulus and 90° flexural modulus were maintained. Thus, excellent physical properties as a composite material were observed.

The invention claimed is:

1. A polymer microparticle-dispersed resin composition, comprising: 100 parts by weight of a resin which is at least one selected from the group consisting of curable monomers, polymerizable monomers, curable oligomers and polymerizable oligomers; and 0.1 parts by weight to 150 parts by weight of polymer microparticles each comprising at least two layers including a crosslinked polymer layer and a coating polymer layer,
the resin composition having a particle dispersity of the polymer microparticles in the resin of not lower than 50%, wherein the particle dispersity is determined by equation (1):

Particle dispersity (%)=(1−($B_1$/$B_0$))×100  (equation 1)

where $B_0$ is the number of unbound polymer microparticles and the number of aggregates consisting of two or more polymer microparticles in contact with each other in a sample under measurement, and $B_1$ is the number of aggregates consisting of two or more polymer microparticles in contact with each other,
the crosslinked polymer layer comprising 65% by weight to 99% by weight of at least one monomer having a Tg, as determined as a homopolymer, of not lower than 80° C., and 35% by weight to 1% by weight of at least one monomer having a Tg, as determined as a homopolymer, of lower than 0° C., wherein the monomer having a Tg, as determined as a homopolymer, of lower than 0° C. forms an acrylic polymer rubber.

2. The polymer microparticle-dispersed resin composition according to claim 1, wherein the crosslinked polymer layer comprises at least 2 layers comprising a first crosslinked polymer layer comprises at least a crosslinked polymer layer comprising not less than 60% by weight of the monomer having a Tg, as determined as a homopolymer, of not lower than 80° C., and a second crosslinked polymer layer comprising not less than 60% by weight of the monomer having a Tg, as determined as a homopolymer, of lower than 0° C., wherein the monomer having a Tg, as determined as a homopolymer, of lower than 0° C. forms an acrylic polymer rubber.

3. The polymer microparticle-dispersed resin composition according to claim 1,
wherein the coating polymer layer comprises a monomer containing a polymerizable or curable functional group, and
the functional group is at least one selected from the group consisting of an epoxy group, an oxetane group, a hydroxyl group, a carbon-carbon double bond, an amino group, an imide group, a carboxylic acid group, a carboxylic acid anhydride group, a cyclic ester group, a cyclic amide group, a benzoxazine group, and a cyanate ester group.

4. The polymer microparticle-dispersed resin composition according to claim 1,
wherein the polymer microparticles have a number average particle size of 10 to 1000 nm.

5. The polymer microparticle-dispersed resin composition according to claim 1, wherein the curable or polymerizable monomers or oligomers are organic compounds containing a polymerizable or curable functional group.

6. The polymer microparticle-dispersed resin composition according to claim 5,
wherein the functional group is at least one selected from the group consisting of an epoxy group, an oxetane group, a hydroxyl group, a carbon-carbon double bond, an amino group, an imide group, a carboxylic acid group, a carboxylic acid anhydride group, a cyclic ester group, a cyclic amide group, a benzoxazine group, and a cyanate ester group.

7. A method for preparing of the polymer microparticle-dispersed resin composition according to claim 1,
a first step of mixing an aqueous medium dispersion containing the polymer microparticles dispersed in an aqueous medium with an organic solvent having a water solubility at 20° C. of at least 5% by mass but not more than 40% by mass, and further mixing the mixture with excess water, thereby providing loose aggregates of the polymer microparticles;
a second step of separating and recovering the aggregates of the polymer microparticles from the liquid phase, and mixing the aggregates with an organic solvent again, thereby providing a dispersion of the polymer microparticles; and
a third step of mixing the dispersion of the polymer microparticles with a resin, and evaporating the organic solvent.

8. A prepreg, comprising:
the polymer microparticle-dispersed resin composition according to claim 1; and
reinforcing fibers.

9. A fiber reinforced composite material, comprising a resin and reinforcing fibers,
the material being obtained by curing the polymer microparticle-dispersed resin composition according to claim 1.

* * * * *